Aug. 4, 1931.   P. A. HAUENSTEIN   1,817,371
ARTICLE SECURING BRACKET
Filed Aug. 6, 1929
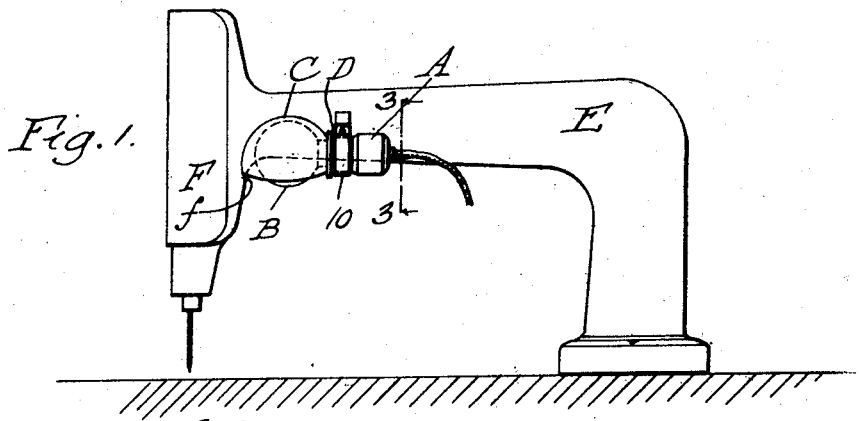
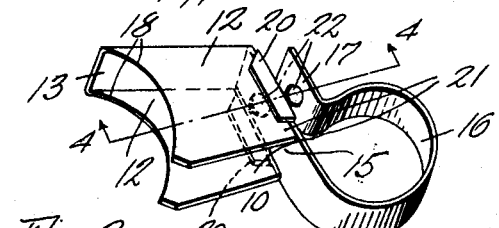
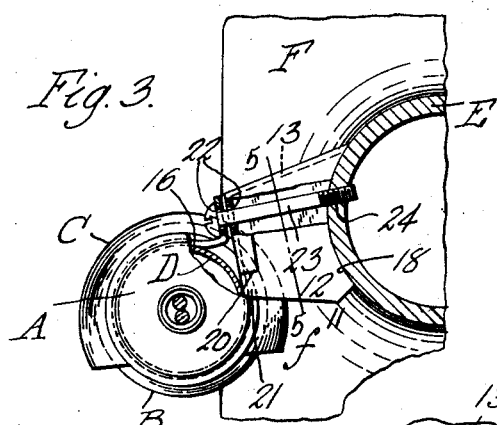
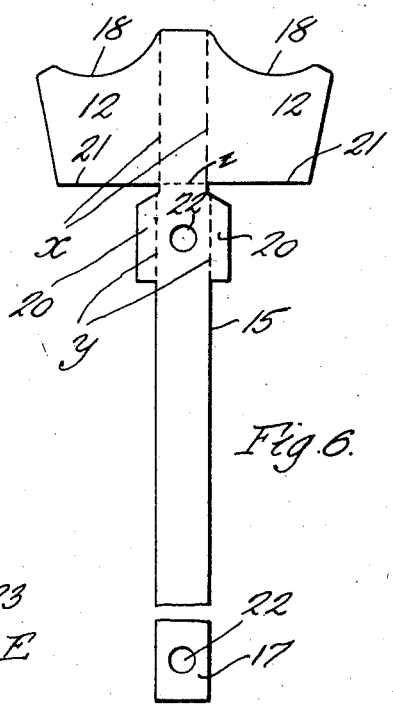
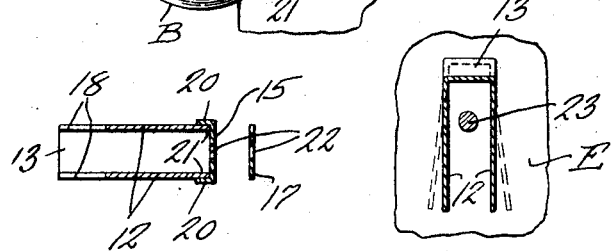
INVENTOR.
Paul A. Hauenstein
by Parker & Prochnow
ATTORNEYS Patented Aug. 4, 1931

1,817,371

UNITED STATES PATENT OFFICE

PAUL A. HAUENSTEIN, OF BUFFALO, NEW YORK, ASSIGNOR TO VIMCO MFG. COMPANY, INC., OF BUFFALO, NEW YORK

ARTICLE SECURING BRACKET

Application filed August 6, 1929. Serial No. 383,940.

This invention relates to improvements in brackets or attaching devices for securing articles to supports and which may be used for securing electric lamps to sewing machines or other machines or apparatus on which special illumination is desirable.

Electric lamps mounted on sewing machines or other machines and apparatus are subject to considerable vibration, and it is an object of the present invention to provide a bracket or attaching device by means of which an electric lamp may be securely attached to a part of the machine, and by the use of which vibration of the lamp is substantially reduced.

Other objects are to provide an improved bracket or attaching device of this character which is so constructed that an article may be supported in the bracket and said bracket attached to the machine or support by a single securing screw or other fastening; also to construction a bracket or device of this kind which can be inexpensively formed of a single sheet metal stamping and which is neat in appearance and durable in use; also to provide a bracket or attaching device which is so constructed that the same may be firmly secured to a part of a machine or to other supports regardless of slight variations in the contour of the machine part or support; also to construct a bracket or attaching device which is so constructed that the screw or other fastening for securing said bracket to a support is practically concealed within or by said device.

Another more specific object is to provide a bracket or attaching device with which, when used in connection with sewing machines, a lamp of an improved compact type having a substantially spherical bulb or lighting element and a hemispherical reflector closely fitting said bulb, can be employed and which can be supported by said bracket close to or extending within a recess or concaved portion of the arm of the machine in position to afford the maximum illumination of the work.

Other objects are to improve and simplify the construction of brackets or attaching devices of this sort in the other respects hereinafter set forth and claimed.

This invention is herein described as used for the purpose of mounting an electric light on a sewing machine, but it will be obvious that the attachment may be used for securing other articles to other supports or to machines or apparatus other than sewing machines.

In the accompanying drawings:

Fig. 1 is a side elevation of a sewing machine frame or body having an electric lamp supported thereon by means of my improved bracket or attaching device.

Fig. 2 is a perspective view of the bracket or attaching device.

Fig. 3 is a side elevation, partly in section thereof, and a portion of a sewing machine frame to which the same is attached, taken along the line 3—3, Fig. 1.

Fig. 4 is a transverse section of the device approximately on the line 4—4, Fig. 2.

Fig. 5 is a section of the device on line 5—5, Fig. 3.

Fig. 6 is a face view of a sheet metal blank from which one of my improved brackets or attaching devices is made, showing the same before bent to shape.

The body of a sewing machine is conventionally shown in Fig. 1 to illustrate one use of my improved lamp bracket or securing device for supporting a lamp in position for illuminating the work.

A lamp of any well known type as ordinarily used for this purpose, can be mounted by means of the improved bracket. Preferably, however, the lamp as illustrated, is of an improved compact type having a socket A from one end of which the usual cord projects, an electric lamp or bulb B of substantially spherical form secured in the socket, and a reflector C extending over said bulb B and which conforms to the shape thereof and extends closely about the same. The socket has a reduced neck or portion D.

The lamp as thus briefly described can be mounted in operative position at either side of the arm E of the machine so as to throw the light downwardly upon the work, by means of the improved attaching device which preferably embraces and is clamped about the neck or reduced portion D of the lamp. The attaching device is designated generally by the numeral 10.

The bracket or attaching device 10 is particularly desirable for use in connection with machines of the type shown in Fig. 1, in which at the connection between said arm E and the head F there is a concavity or space $f$, as by its use the lamp can be arranged alongside and close to the arm so that the reflector C extends partly into said space. The lamp is thus disposed adjacent the head and directly over the work, so that the latter will be well lighted. Moreover the lamp thus mounted does not project beyond the side of the machine to an undesirable extent.

The article supporting bracket or attaching device 10, as before stated, is preferably formed of sheet metal and includes a body portion 11 comprising opposite, substantially parallel side walls or pieces 12 connected along their upper edges by an integral top wall 13. The outer side of the body portion 11 is further closed by a strip or portion of metal 15 which is preferably an integral extension of said top wall 13 with its opposite edges abutting against the adjacent edges of the side pieces 12. The strip 15 is extended or projects downwardly beyond the body portion in substantially circular form to provide a flexible clamping band or gripping member 16. This band terminates in a lug or ear 17 disposed adjacent to and parallel with the aforesaid strip portion 15. The strip 15 could, if desired, form an extension of or be secured to one of the other side walls of the body 11.

The side of the body portion remote from the strip 15 is open and unobstructed, as is also the bottom of said body member.

The free side edges of the side pieces 12, that is, those at the open side of said body 11, are preferably curved or otherwise shaped as shown at 18, to conform approximately to the exterior cross sectional shape or contour of the arm F or part of the support or machine frame to which the bracket is to be secured, and these edges abut against said part substantially throughout their entire length when secured in the manner to be described.

As shown, particularly in Figs. 2 and 4, the part 15 of the lamp or article embracing member or band 16 has a portion of one or both of its side edges formed with an offset projection or flange 20 which projects upon and engages the outer face of the adjacent side piece 12, thus confining a portion of said side piece or pieces against outward lateral movement or spreading.

As shown, the portion 15 and the free end 17 of the clamping member or band 16 are provided with registering holes 22. Therefore, by passing a suitable securing device, such as a screw 23 through these holes, with its head engaging said end 17 and its intermediate portion extending between the side walls 12, its inner threaded end can be secured in the threaded hole 24 in the arm E of the machine or support. The screw 23 is turned into the hole 24 until the head of the screw bearing against the portion 17 draws the band 16 tightly about the neck of the lamp or article. At the same time the screw will force the curved edges 18 of the side walls 12 into firm contact with the curved face of the arm.

Should the curvature of the edges 18 vary slightly from that of the arm or part E, the pressure exerted by the screw 23 when turned up tightly will act to spread the side walls 12 apart to a limited extent, so that they will extend in diverging or angular relation one by the flanges 20. Thus the edges 18 will and the lower edges of the side piece are free while edges 21 of said side walls 12 are confined or restrained from outward movement by the flanges 20. Thus the edges 18 will eventually find a position in which they will coincide substantially or align themselves with the curvature of the arm or part E, and thus permit the attaching device to be firmly seated against the support.

As shown in Fig. 6, the bracket or securing device can be readily formed from a single sheet metal stamping which, when bent along the lines $x, y, z$, will provide the body portion 11, after which it is only necessary to bend the elongate part of the blank into the approximately annular article encircling portion 16.

The bracket or attaching device described can be easily and cheaply stamped from a single piece of relatively light sheet metal. A lamp or other article can be readily attached to said bracket and the bracket secured to a machine or other support by a single screw or fastening device which latter is substantially concealed within the bracket. The construction described also enables a bracket of this sort to be produced, which by reason of the self aligning or self adjusting feature of the side pieces 12, enables the bracket to be very securely fastened to a support in such manner that vibration is reduced to a minimum and, when used to support a lamp, the life of said lamp is prolonged.

Claims:—

1. An attaching device for securing an article to a support, including a body having three walls, a clamping member extending from one of said walls and engaging an edge only of each of the other walls and formed to grip an article, and a securing element adapted to pass into said support and acting to draw said clamping member tightly upon said article and against said edges and which also holds said attaching device firmly against said support.

2. An attaching device for securing an article to a support, including a body having walls, two of which are in spaced relation and extend approximately in the same direction, a clamping member having a part projecting from one of said walls and extending in a plane substantially at right angles to said walls and along an edge of another wall, and a part on said clamping member engaging a portion of the outer face of one of said walls to prevent outward deflection of said wall.

3. An attaching device for securing an article to a support, including a body formed to bear against said support, a clamping member integrally connected to said body at one end thereof and which is formed to grip an article, and a screw passing through both ends of said member to draw the same tightly upon said article and through said body and adapted to pass into said support to hold said device firmly against the latter.

4. An attaching device for securing an article to a support including a body having spaced side pieces, the edges of which engage the support and conform approximately to the contour of the support, said side pieces being free to flex and diverge under pressure exerted edgewise thereof, a part extending from said body for supporting the article, and a securing element adapted to enter said support and to bear against a part of said attaching device and acting to cause said side pieces to diverge until said edges thereof attain a position in which they closely fit said support.

5. A sheet metal attaching device for securing an article to a support, including a body portion having spaced side pieces, an integral wall connecting an edge of each side piece, an integral clamping member which engages another edge of each of said side pieces and is formed to grip the article, projecting parts on said clamping member engaging the adjacent outer face portions of said side pieces to prevent the adjacent edge portions of said pieces from outward displacement, said side pieces having free edges opposite said last mentioned edges which conform substantially to the contour of a part of said support, and a securing element passing through apertures in the opposite ends of said clamping member and into said support to clamp said member tightly about the article and force said free edges of said side pieces against said support and exert pressure against said side pieces, whereby their unattached portions will flex and adjust themselves to the contour of said support.

6. A sheet metal attaching device for securing an article to a support, including a body portion having spaced side pieces, an integral wall connecting an edge of each side piece, an integral clamping member which engages another edge of each of said side pieces and is formed to grip the article, said side pieces having free edges opposite said last mentioned edges which conform substantially to the contour of a part of said support, and a securing element passing through apertures in the opposite ends of said clamping member and into said support to clamp said member tightly about the article and force said free edges of said side pieces against said support and exert pressure against said side pieces, whereby their unattached portions will flex and adjust themselves to the contour of said support.

7. A one piece sheet metal attaching device for securing an article to a support, including an end wall, opposite spaced side walls extending therefrom and each of which has an edge conforming substantially to the contour of a part of said support, a strip extending from one of said walls along an edge of each of said other walls and which is formed to encircle and clamp the article, and a part on said strip which engages and confines the adjacent edge portion of one of said walls against outward deflection.

8. An attaching device including a body having spaced side walls each having an edge shaped to conform substantially to the contour of a sewing machine arm and to abut against the same, means carried by said body for rigidly supporting a clamp and adapted to engage edges of said side walls opposite to those abutting against said arm, and a securing member adapted to be secured at one end to said arm and engaging said lamp supporting means to press the same against said side walls, and consequently to press said side walls against said arm.

9. A sheet metal attaching device for securing an article to a support, including a body portion having spaced side pieces, an intergral wall connecting an edge of each side piece, an integral clamping member which engages another edge of each of said side pieces and is formed to grip the article, projecting parts on said clamping member engaging the adjacent outer face portions of said side pieces to prevent the adjacent edge portions of said pieces from outward displacement, and a securing element adapted to engage said support and pressing said clamping member into engagement with the article with said side pieces and pressing said side pieces against said support.

PAUL A. HAUENSTEIN.